US011228657B2

(12) United States Patent
Bennett et al.

(10) Patent No.: US 11,228,657 B2
(45) Date of Patent: Jan. 18, 2022

(54) HYBRID PROXYING WITH USER SPACE HOLD

(71) Applicant: RED HAT, INC., Raleigh, NC (US)

(72) Inventors: Benjamin Bennett, Bedford, MA (US); Aaron Patrick Conole, Lowell, MA (US); Solomon Lee Ross, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 111 days.

(21) Appl. No.: 16/701,287

(22) Filed: Dec. 3, 2019

(65) Prior Publication Data

US 2021/0168220 A1 Jun. 3, 2021

(51) Int. Cl.
*G06F 15/16* (2006.01)
*H04L 29/08* (2006.01)
*G06F 9/54* (2006.01)

(52) U.S. Cl.
CPC .......... *H04L 67/2819* (2013.01); *G06F 9/545* (2013.01)

(58) Field of Classification Search
CPC .............................. H04L 67/2819; G06F 9/545
USPC ........................................................ 709/227
See application file for complete search history.

(56) References Cited

U.S. PATENT DOCUMENTS

| 10,127,091 | B1 * | 11/2018 | MacNeil ................. G06F 9/545 |
| 10,361,921 | B2 | 7/2019 | McGleenon et al. |
| 2018/0275997 | A1 * | 9/2018 | Chen ..................... G06F 9/4451 |
| 2019/0222559 | A1 | 7/2019 | Wang et al. |
| 2019/0260837 | A1 * | 8/2019 | Kang ................... H04L 67/2819 |
| 2019/0306282 | A1 * | 10/2019 | Masputra ............ H04L 49/9052 |

OTHER PUBLICATIONS

Kirill Goltsman, Understanding Kubernetes Kube-Proxy, Apr. 11, 2019, pp. 1-10 (Year: 2019).*
Goltsman, K., "Understanding Kubernetes Kube—Proxy," Qbox Inc., Apr. 11, 2019, https://supergiant.io/blog/understanding-kubernetes-kube-proxy/.
Gunaratne, I., "A Beginner's Guide to Kubernetes," May 23, 2018, https://medium.com/containermind/a-beginners-guide-to-kubernetes-7e8ca56420b6.
"Concepts: Service—Kubernetes," The Kubernetes Authors, 2019, https://kubernetes.io/docs/concepts/services-networking/service/.
"Control Network Traffic with Iptables," Linode, LLC, Jun. 23, 2018, https://www.linode.com/docs/security/firewalls/control-network-traffic-with-iptables/.

* cited by examiner

*Primary Examiner* — Hee Soo Kim
(74) *Attorney, Agent, or Firm* — Kilpatrick Townsend & Stockton LLP

(57) ABSTRACT

Certain features and aspects provide a proxy for a node in a cloud computing cluster that holds the packet used by a remote client to initiate a connection until a backend server is ready. When the user space controller receives the packet, it notifies the server that a connection is being established and holds the packet until the proxy receives a notification that the server is ready. The user space controller of the proxy then writes routing information to memory so that kernel space is used for the connection traffic going forward, and reinjects the packet into the networking layer of the cluster. Subsequent packets, including any acknowledgement packet that is part of the initial handshake, will flow through kernel space without involvement of the user space controller and be processed more efficiently than would be possible using user space.

20 Claims, 4 Drawing Sheets

HYBRID PROXYING WITH USER SPACE HOLD

TECHNICAL FIELD

The present disclosure relates generally to managing network traffic through proxies deployed in a cloud computing cluster. More specifically, but not by way of limitation, this disclosure relates to provisioning the network connection to use a kernel space process of a proxy in order to improve performance.

BACKGROUND

A cloud computing system such as one based on Kubernetes® or OpenShift® includes clusters to which various applications are deployed. Requests for services are routed to the applications. A request, as an example, might be a request from a remote client to set up a connection to one of the applications. Such a connection is typically made using transmission control protocol (TCP). TCP provides reliable, connection-oriented communication between two endpoints using internet protocol (IP) messages. In a cloud computing cluster, IP traffic may be forwarded between or among proxies in order to route the traffic to its intended destination as efficiently as possible. A proxy is a communication function deployed within the cluster. A proxy routes external requests to services deployed in a cluster in order to provide a consistent external interface to services in the cluster. By using proxies, changes to how the services are deployed or addressed in the cluster are transparent to external users. Typically, one proxy instance resides at each node in the cluster.

DETAILED DESCRIPTION

Figure 1:
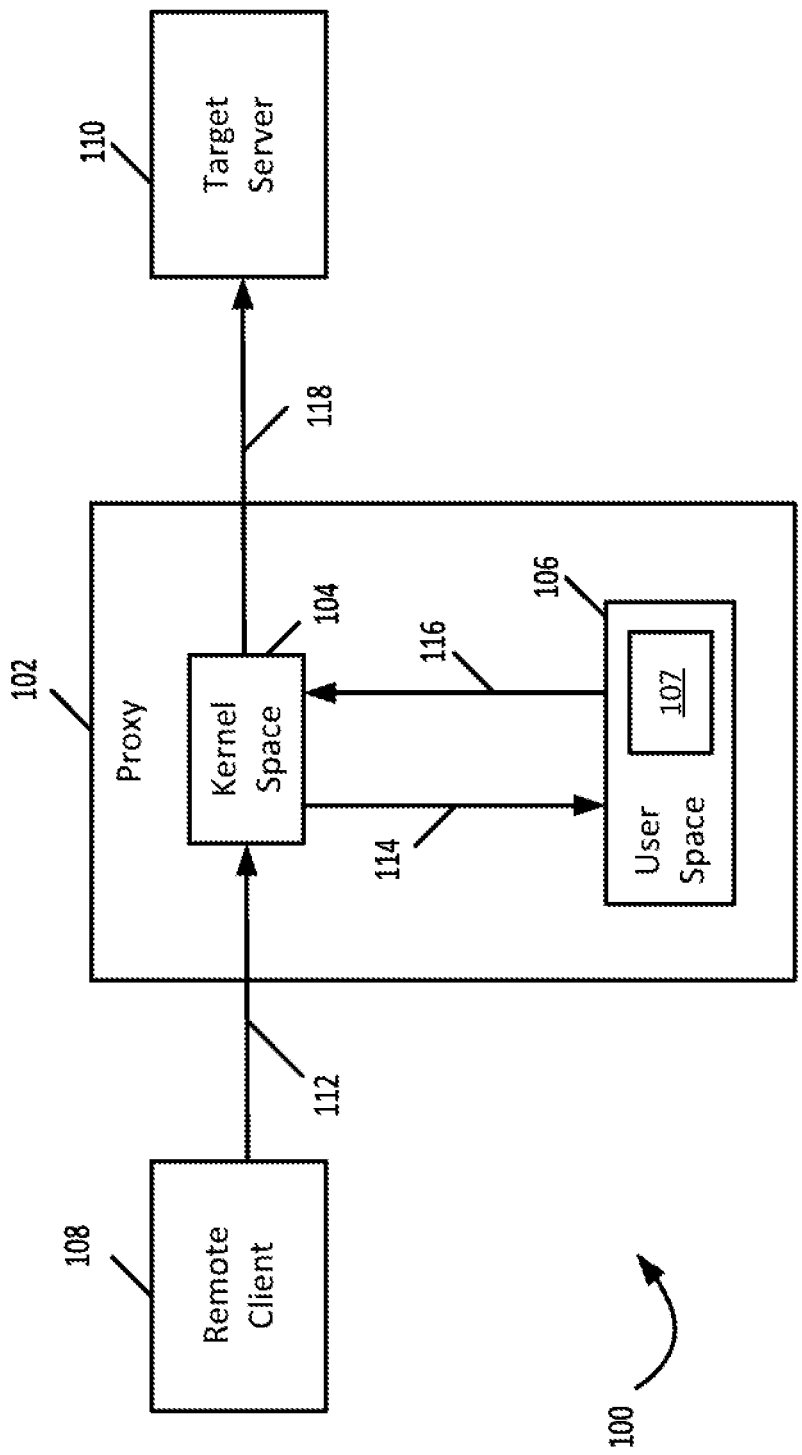
FIG. 1 is an entity block diagram showing an example of messaging related to hybrid proxying with a user space hold according to some aspects of the disclosure.

In a cloud computing cluster, IP traffic may be forwarded between or among proxies. A proxy is a communication function deployed within the cluster, typically one proxy instance for each node in the cluster. A proxy routes external requests to services deployed in a cluster in order to provide a consistent external interface. As is common with modern software, a proxy includes a number of processes, some of which run in the user space of the operating system while others run in the kernel space of the operating system. User space processes are typically responsible for more complex signaling and control, while the kernel space can be used for traffic routing that requires minimal decisioning, for example, traffic routing after a connection is defined and its parameters are known.

Kernel space processes execute with higher performance and are more secure since the operating system kernel is more closely connected with the processing hardware of the node. Thus, although the complexity of initiating a connection requires a proxy controller that resides in user space, traffic handling once the connection is established and defined would ideally be handled in kernel space, both for performance reasons and for security reasons.

However, when a remote client requests a connection, there can be a significant delay until the target server is ready to service the connection. In the meantime, a reply to the remote client requires routing information, such as a sequence number, which will be generated by the controller in the proxy, which is in user space and is therefore sometimes called the user space controller. The target server, once available, in the case of a delay, generates its own, different routing information when it is finally is reachable, and the ongoing traffic using the two sets of information can only be handled in the user space controller due to the complexity introduced by having different information on each end of the connection (e.g., the routing information generated by the target server and the routing information generated by the proxy that is forwarding traffic from the remote client to the target server).

Some examples of the present disclosure overcome the issues mentioned above by providing a proxy user space controller that holds the packet used by a remote client to initiate a connection until the target (backend) server is up and ready. With TCP, this packet is typically referred to as a connection synchronize message or SYN packet, although this terminology and the described technique could be applied to any protocol.

When the user space controller receives the SYN packet, it notifies the server that a connection is being established and holds the SYN packet until it receives a notification that the server is ready. The user space controller of the proxy then writes routing information to memory, where the routing information may in some examples be open vSwitch (OVS) information or an IP routing table. The user space controller then reinjects the SYN packet into the networking layer so that the SYN packet is delivered to the newly-ready backend server. Subsequent packets, including the acknowledgement (ACK) packet that is part of the initial handshake when the connection finally completes, will now have the same routing information as in the SYN packet, will flow through kernel space without involvement of the user space controller. Using the kernel for these connections maximizes throughput. Kernel-based connections are also more secure, since the kernel is reserved for privileged processes it is difficult to use nefarious techniques to retrieve connection information from the kernel.

As an example, a processing device in a system can capture a connection synchronize message in a proxy. The connection synchronize message originates from a remote client and is captured from a networking layer in a cloud computing cluster. The processing device routes the connection synchronize message to a user space process of the proxy, and then starts, using user space processes, a target server process for a transmission control protocol (TCP) connection corresponding to the connection synchronize message and stores the connection synchronize message. The processing device stores routing information defining the TCP connection for a kernel space process and reinserts the connection synchronize message into the networking layer, so as to direct the connection synchronize message to the target server process and establish the TCP connection using the kernel space process and the original information in the SYN packet.

In some examples, the connection is established for a kernel space process because the connection is defined around a single set of routing information, and the connection synchronize message is held in the user space process until the target server process is live and ready so that the information can be unified. In some examples, the connection synchronize message in the user space process is replaced when the remote client retries the TCP connection.

The connection synchronize message can be captured from various parts of the network layer. In some examples, the connection synchronize message is captured from a local resource. A local resource is a network layer resource within the cluster. As examples, the local resource can be a local kernel or a local virtual switch. The connection synchronize message can also be captured from a remote resource such as a remote switch.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an entity block diagram of an example of a system 100 that includes the messaging related to initiating a TCP connection according to features and aspects of this disclosure. The system 100 includes proxy 102 serving as an intermediary between a remote client 108 and a target server 110.

Proxy 102 includes a collection of kernel space processes 104 and a collection of user space processes 106, which for purposes of this disclosure may be referred to as kernel space and user space, respectively. User space 106 includes a controller 107 that can process messaging through the proxy 102.

In this example, the remote client 108 initiates a TCP connection with target server 110 through the proxy 102. For example, the remote client 108 sends a SYN message to the proxy 102 via signaling path 112. The SYN message is routed from kernel space 104 to the user space 106 of the proxy 102 via path 114, which is internal to the node running this particular instance of the proxy 102. The SYN message is initially received in kernel space 104 because the operating system kernel interfaces with hardware such as the network adapters and I/O. The SYN message is sent to user space 106 and is held in user space 106 until target server 110 is up and ready to service the TCP connection. At that point, the SYN message is routed back to the kernel space 104 via signaling path 116. Proxy 102 then reinserts the SYN message into the networking layer of the cluster so it is forwarded to target server 110 via signaling path 118, setting up the TCP connection using the routing information from the original SYN message at both the client and server ends of the connection. While this example involves initiating a TCP connection using SYN messages, other examples may involve initiating other types of connections using other types of messages and protocols.

Figure 2:
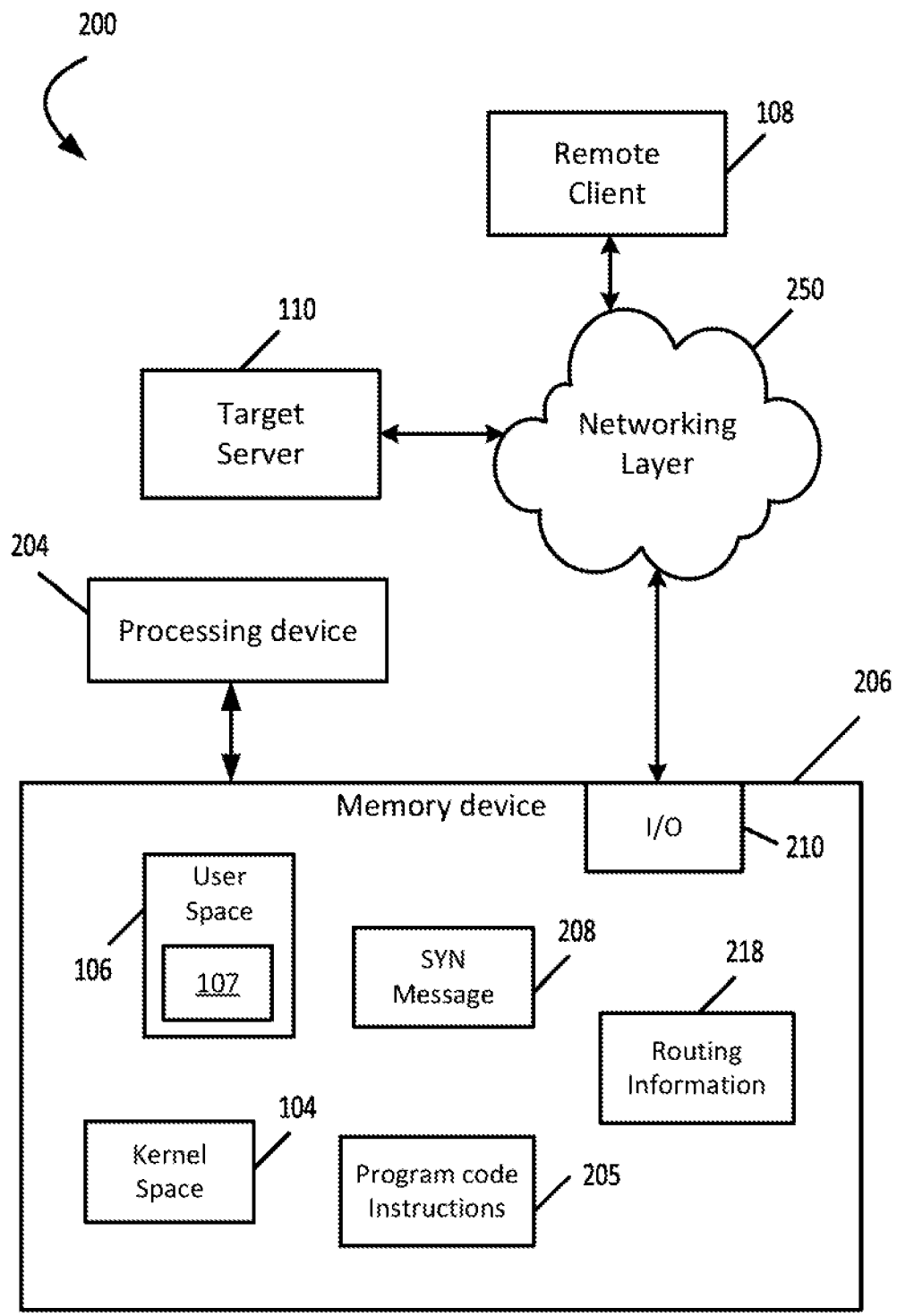
FIG. 2 is a block diagram of an example of a system that provides hybrid proxying with a user space hold according to some aspects of the disclosure.

FIG. 2 is a block diagram of an example of a system 200 that provides hybrid proxying with a user space hold according to some aspects of the disclosure. The system 200 includes a processing device 204 communicatively coupled to a memory device 206. The processing device 204 can execute computer program code, also referred to as software, instructions, or program code instructions 205, for performing operations related to providing hybrid proxying with a user space hold according to some aspects of the disclosure. The processing device 204 can include one processing device or multiple processing devices. Non-limiting examples of the processing device 204 include a field-programmable gate array (FPGA), an application-specific integrated circuit (ASIC), a microprocessor, etc. Software can include computer-readable instructions that are executable by a processing device 204, such as program code instructions 205. The system can be programmed in any suitable programming language, such as Java, C++, C, and Python.

In some examples, the processing device 204 of FIG. 2 can capture, store, and hold SYN message 208 in memory device 206. The SYN message originates from remote client 108. A process in target server 110 for a transmission control protocol (TCP) connection corresponding to the SYN message 208 is initiated by forwarding a copy of the SYN message to the target server, but processing device 204 holds SYN message 208 in memory device 206 until target server 110 is up and ready. Once the processing device 204 determines that the target server 110 is up and ready, the processing device 204 running the controller 107 in user space 106 stores routing information 218 defining the TCP connection in the memory device 206 for use by the kernel space 104. The processing device 204 also reinserts the SYN message 208 into the networking layer 250 to direct the SYN message to the target server 110 and establish the TCP connection using the kernel space 104. While this example involves initiating a TCP connection using SYN messages, other examples may involve initiating other types of connections using other types of messages and protocols.

The networking layer 250 can include virtual and real switches that serve to interconnect nodes, servers, and clients, as well as cluster-internal kernel resources involved in messaging. The networking layer 250 may include a portion of the kernel processes for the proxy being run by processing device 204 as well as portions of kernel processes running in other nodes of the cluster The memory device 206 can include one memory device or multiple memory devices. The memory device 206 can be non-volatile and may include any type of memory device that retains stored information when powered off. In some examples, at least some of the memory device can include a non-transitory computer-readable medium from which the processing device 204 can read instructions 205. A computer-readable medium can include electronic, optical, magnetic, or other storage devices capable of providing the processing device with computer-readable instructions 205 or other program code. Non-limiting examples of the memory device 206 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

In some examples, the memory device and the processing device shown may be a portion of a server or similar computer system or multiple computer systems that also include an input/output (I/O) module or modules 210, a random-access memory (RAM, not shown), and a bus or interconnect (not shown) to allow for inter- and intra-device communications. I/O module 210 can include a network interface (not shown), which in turn communicates with the network. I/O module 210 can also receive input from a user.

Figure 3:
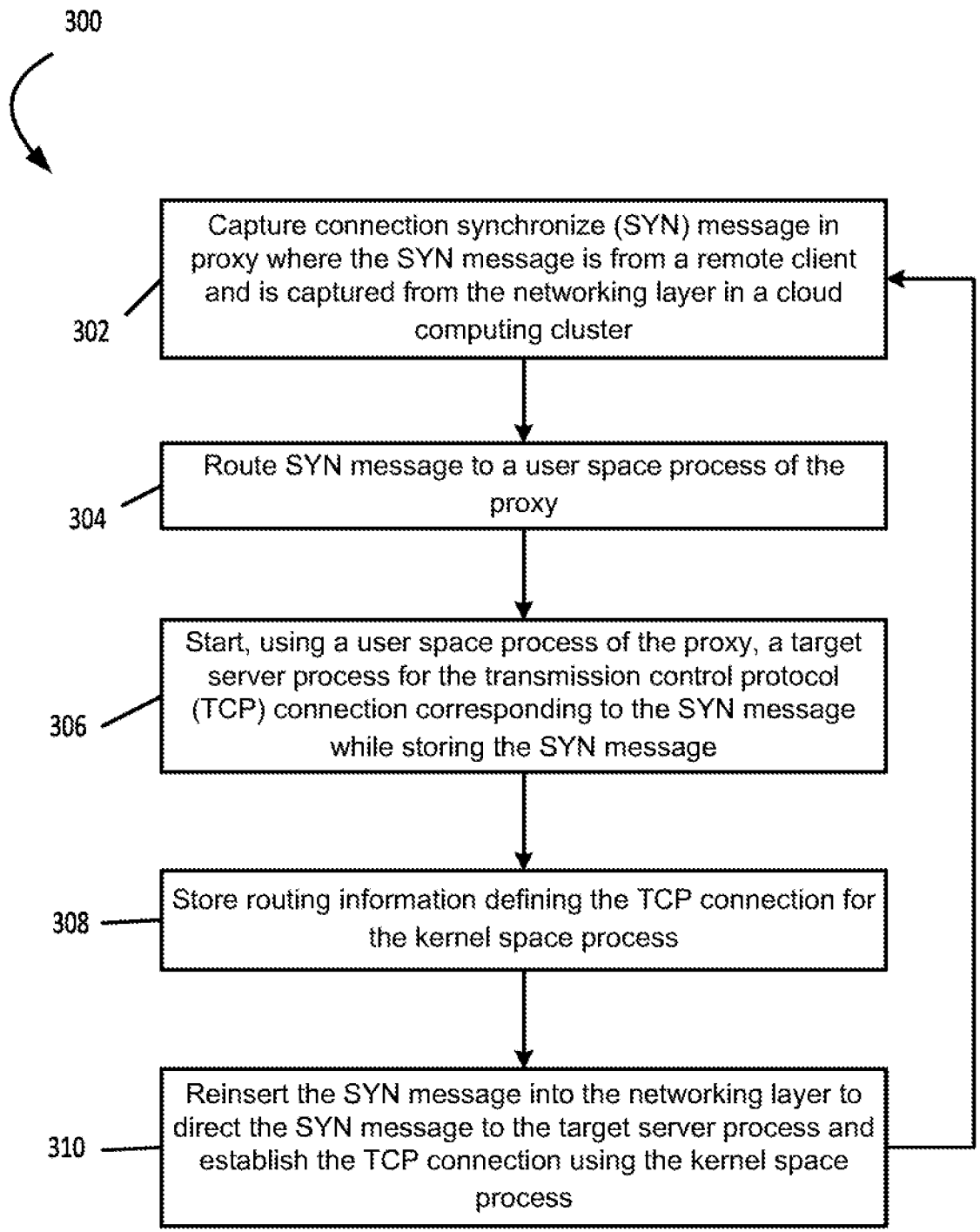
FIG. 3 is a flowchart of an example of a process for providing hybrid proxying with a user space hold according to some aspects of the disclosure.

In some examples, the processing device 204 can perform one or more of the operations shown in FIG. 3 to provide hybrid proxying with a user space hold according to some aspects of the disclosure. In other examples, the computing device can implement more operations, fewer operations, different operations, or a different order of the operations depicted in FIG. 3. Process 300 of FIG. 3 is described below with reference to components discussed above.

At block 302, processing device 204 captures a connection synchronize (SYN) message in a proxy, where the SYN message is from a remote client 108 and is captured from a networking layer 250 in a cloud computing cluster. At block 304, the SYN message is routed to a user space controller 107 of the proxy. At block 306, the proxy, under the control of processing device 204, starts the target server process for a transmission control protocol (TCP) connection corresponding to the SYN message. At block 308, processing device 204 stores the SYN message 208 in memory device 206 while waiting for the target server 110 to become ready to handle the connection. At block 310, processing device 204 reinserts the SYN message into networking layer 250 to direct the SYN message to the target server 110 and establish the TCP connection using the kernel space process of the proxy.

Figure 4:
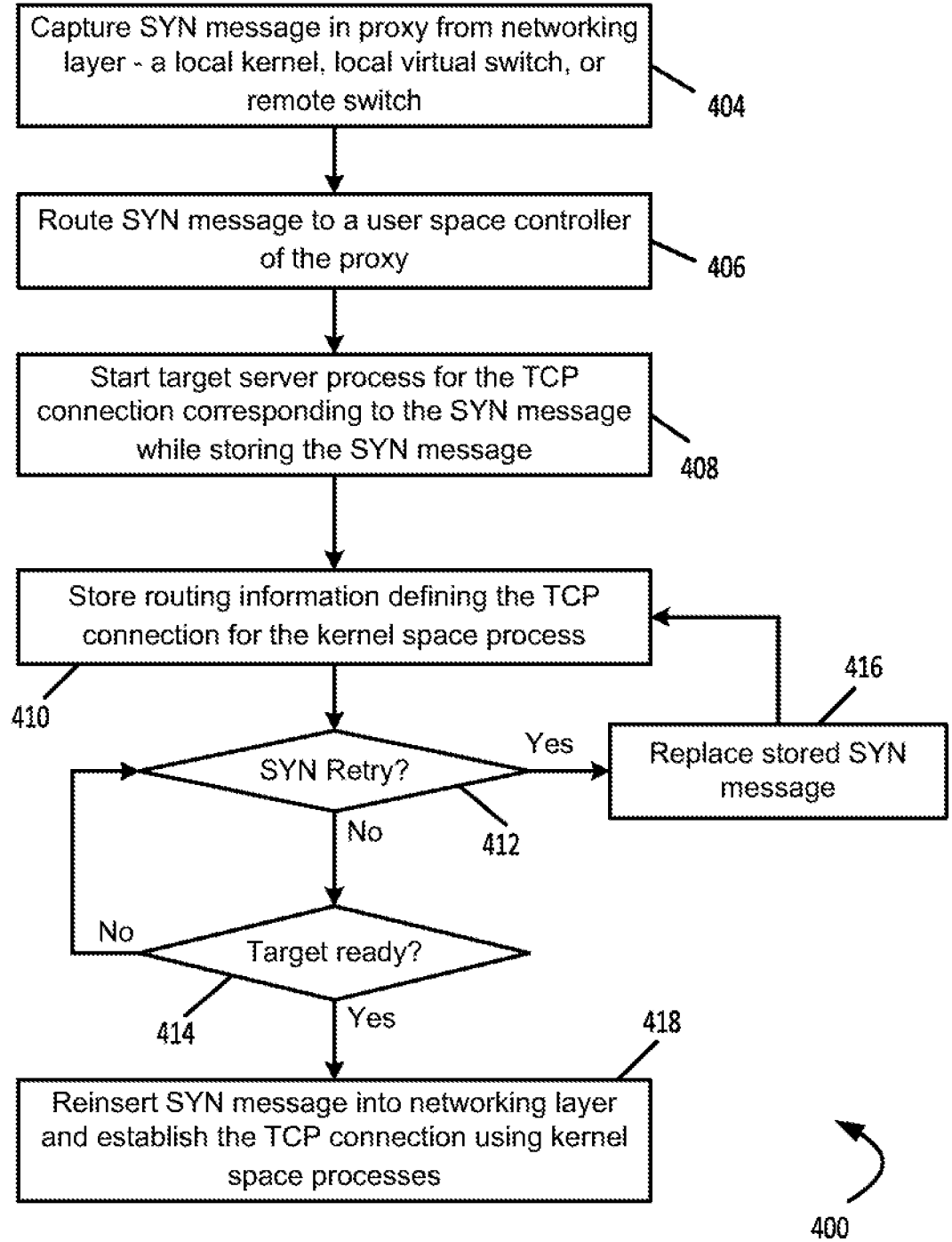
FIG. 4 is a flowchart of another example of a process for providing hybrid proxying with a user space hold according to some aspects of the disclosure.

As another example, a server or similar computer system like that shown in FIG. 2 running a proxy can perform the operations of process 400 shown in FIG. 4 to provide hybrid proxying with a user space hold according to some aspects of the disclosure. The process 400 of FIG. 4 is described below with reference to software entities already discussed in FIG. 1.

At block 404 of FIG. 4, the server running proxy 102 captures the SYN message from the networking layer. The SYN message originates from remote client 108 and is captured from the networking layer. The SYN message can for example be captured from a local resource such as a local kernel or local virtual switch. The SYN message could also be captured from a remote switch. At block 406, the SYN message is routed to user space controller 107 of proxy 102. At block 408, proxy 102 starts a target server process for the TCP connection that corresponds to the SYN message. Proxy 102 also stores and holds the SYN message. At block 410, the user space controller 107 stores routing information defining the TCP connection for kernel space processes 104. The routing information, as an example, can be an IP routing table stored with a privilege level that allows access only by the kernel.

Still referring to FIG. 4, the proxy 102 now holds the SYN message until the target server 110 is up and ready. During the hold, the proxy 102 also monitors for retries by the remote client 108 at block 412. If proxy 102 receives a SYN retry at block 412, the system replaces the stored SYN message with the new message at block 416. Stored routing information is updated at block 410 if necessary, and the proxy 102 continues to monitor for retry messages or a message that indicates the target server 110 is ready.

At block 414, the system waits for a notification from the target server 110 that the server is ready to service a TCP connection. The readiness of the target server in this example is indicated by an acknowledgment (ACK) message. The ACK message is part of the TCP connection handshake. At block 418, proxy 102 reinserts the SYN message into the networking layer and establishes the TCP connection using its kernel space processes.

In the scenario above, only the first packet that is received at the proxy 102 is transferred to user space 106, where it is held until the target server 110 is started. Once the target server 110 is started, the SYN packet is reinserted and the kernel processes it and all subsequent packets at higher speed than would be possible with user space processing.

Typically, with TCP connections and Linux-based resources, a client will retry the connection and thus send a new SYN message at an interval that doubles with each retry, starting at two seconds. After the first retry, the second retry would be at four seconds, the third retry at eight seconds, etc., up until a final 64-second interval until a time out. The SYN messages are time-stamped and a new one may have changed routing information, therefore the SYN message being held in user space by the proxy needs to be updated. Allowing for typical processing delays, a typical node should have at least 62 second to complete a connection using the techniques described herein, and the connection would typically be completed in significantly less time.

Unless specifically stated otherwise, it is appreciated that throughout this specification that terms such as "operations," "processing," "computing," and "determining" or the like refer to actions or processes of a computing device, such as one or more computers or a similar electronic computing device or devices that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Ranges, and terms such as "less" or "more," when referring to numerical comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, some examples described herein can be combined together to yield further examples.

The invention claimed is:

1. A system comprising:
  a processing device; and
  a memory device including instructions that are executable by the processing device for causing the processing device to perform operations comprising:
    capturing a connection synchronize message in a proxy, the connection synchronize message originating from a remote client and captured from a networking layer in a cloud computing cluster;
    routing the connection synchronize message to a user space process of the proxy;
    holding the connection synchronize message in the user space process until a target server process for a connection corresponding to the connection synchronize message is live and ready;
    starting the target server process using the user space process;
    storing routing information defining the connection for a kernel space process;
    updating the connection synchronize message and the routing information based on receiving a retry message from the remote client; and
    reinserting the connection synchronize message into the networking layer to direct the connection synchronize message to the target server process and establish the connection using a kernel space process.

2. The system of claim 1 wherein the connection is a transmission control protocol (TCP) connection.

3. The system of claim 2 wherein the operations further comprise determining that the target server process is live and ready based on an acknowledgement message received from a target server.

4. The system of claim 3 wherein updating the connection synchronize message further comprises replacing the connection synchronize message with a new connection synchronize message and holding the new connection synchronize message in the user space process until the target server process is live and ready.

5. The system of claim 1 wherein the connection synchronize message is captured from a local resource.

6. The system of claim 5 wherein the local resource is a local kernel or a local virtual switch.

7. The system of claim 1 wherein the connection synchronize message is captured from a remote switch.

8. A method comprising:
   capturing, by a processing device, a connection synchronize message in a proxy, the connection synchronize message originating from a remote client and captured from a networking layer in a cloud computing cluster;
   routing, by the processing device, the connection synchronize message to a user space process of the proxy;
   holding, by the processing device, the connection synchronize message in the user space process until a target server process for a connection corresponding to the connection synchronize message is live and ready;
   starting the target server process using the user space process;
   storing routing information defining the connection for a kernel space process;
   updating the connection synchronize message and the routing information based on receiving a retry message from the remote client; and
   reinserting, by the processing device, the connection synchronize message into the networking layer to direct the connection synchronize message to the target server process and establish the connection using a kernel space process.

9. The method of claim 8 wherein the connection is a transmission control protocol (TCP) connection.

10. The method of claim 9 wherein determining that the target server process is live and ready is responsive to an acknowledgement message received from a target server.

11. The method of claim 10 wherein updating the connection synchronize message further comprises replacing the connection synchronize message with a new connection synchronize message and holding the new connection synchronize message in the user space process until the target server process is live and ready.

12. The method of claim 8 wherein the connection synchronize message is captured from a local kernel or a local virtual switch.

13. The method of claim 8 wherein the connection synchronize message is captured from a remote switch.

14. A non-transitory computer-readable medium comprising program code that is executable by a processing device for causing the processing device to:
   capture a connection synchronize message in a proxy, the connection synchronize message originating from a remote client and captured from a networking layer in a cloud computing cluster;
   route the connection synchronize message to a user space process of the proxy;
   hold the connection synchronize message in the user space process until a target server process for a connection corresponding to the connection synchronize message is live and ready;
   start the target server process using the user space process;
   store routing information defining the connection for a kernel space process;
   update the connection synchronize message and the routing information based on receiving a retry message from the remote client; and
   reinsert the connection synchronize message into the networking layer to direct the connection synchronize message to the target server process and establish the connection using a kernel space process.

15. The non-transitory computer-readable medium of claim 14 wherein the connection is a transmission control protocol (TCP) connection.

16. The non-transitory computer-readable medium of claim 15 wherein the program code is executable by the processing device for causing the processing device to determine that the target server process is live and ready based on an acknowledgement message received from a target server.

17. The non-transitory computer-readable medium of claim 16 wherein the program code that is executable for causing the processing device to update the connection synchronize message is further executable to cause the processing device to replace the connection synchronize message with a new connection synchronize message and hold the new connection synchronize message in the user space process until the target server process is live and ready.

18. The non-transitory computer-readable medium of claim 14 wherein the connection synchronize message is captured from a local resource.

19. The non-transitory computer-readable medium of claim 18 wherein the local resource is a local kernel or a local virtual switch.

20. The non-transitory computer-readable medium of claim 14 wherein the connection synchronize message is captured from a remote switch.

* * * * *